United States Patent [19]

Egley et al.

[11] Patent Number: 5,100,163
[45] Date of Patent: Mar. 31, 1992

[54] ADJUSTABLE TRAINING WHEEL APPARATUS

[76] Inventors: Larry P. Egley; Patricia A. Egley, both of 109 Travelers Trail, St. Charles, Mo. 63303

[21] Appl. No.: 649,993

[22] Filed: Feb. 4, 1991

[51] Int. Cl.⁵ .............................................. B62H 7/00
[52] U.S. Cl. ..................................... 280/293; 280/301
[58] Field of Search ..................... 280/293, 301, 7.15

[56] References Cited

U.S. PATENT DOCUMENTS

| | | | |
|---|---|---|---|
| 1,077,210 | 10/1913 | Alesani | 280/293 |
| 2,220,528 | 11/1940 | Kutil | 280/7.15 |
| 2,450,979 | 10/1948 | Moller | 280/293 |
| 3,746,367 | 7/1973 | Johannsen | 280/293 |
| 3,877,727 | 4/1075 | Johannsen | 280/301 |
| 4,595,213 | 6/1986 | Tsuchie | 280/293 |
| 5,064,213 | 11/1991 | Storch | 280/293 |

FOREIGN PATENT DOCUMENTS

| | | | |
|---|---|---|---|
| 378263 | 7/1923 | Fed. Rep. of Germany | 280/293 |
| 585315 | 8/1932 | Fed. Rep. of Germany | 280/293 |
| 654471 | 4/1929 | France | 280/293 |
| 767879 | 7/1934 | France | 280/293 |
| 511145 | 11/1941 | United Kingdom | 280/293 |

*Primary Examiner*—Mitchell J. Hill
*Attorney, Agent, or Firm*—David L. Baker

[57] ABSTRACT

A first support member is removably attached to the bicycle and a hinge end of a second support member is hingedly attached to an attachment end of the first support member that allows radial movement of the second support member in relation to the first support member. A wheel is rotatively connected to the second support member, at a wheel end of the second support member, distal from the hinge end. An adjustable preloaded strut is attached, at a first end of the strut, to the first support member. The adjustable preloaded strut is also attached, at a second end of the strut, to the second support member. An adjustable stop member is on one of two rotation restriction lobes to restrict the radial movement of the second support member toward the first support member. Hinge rotation stop tabs are on the hinge that connects the first and second support members to limit the amount of radial movement of the second support member away from the first support member.

6 Claims, 1 Drawing Sheet

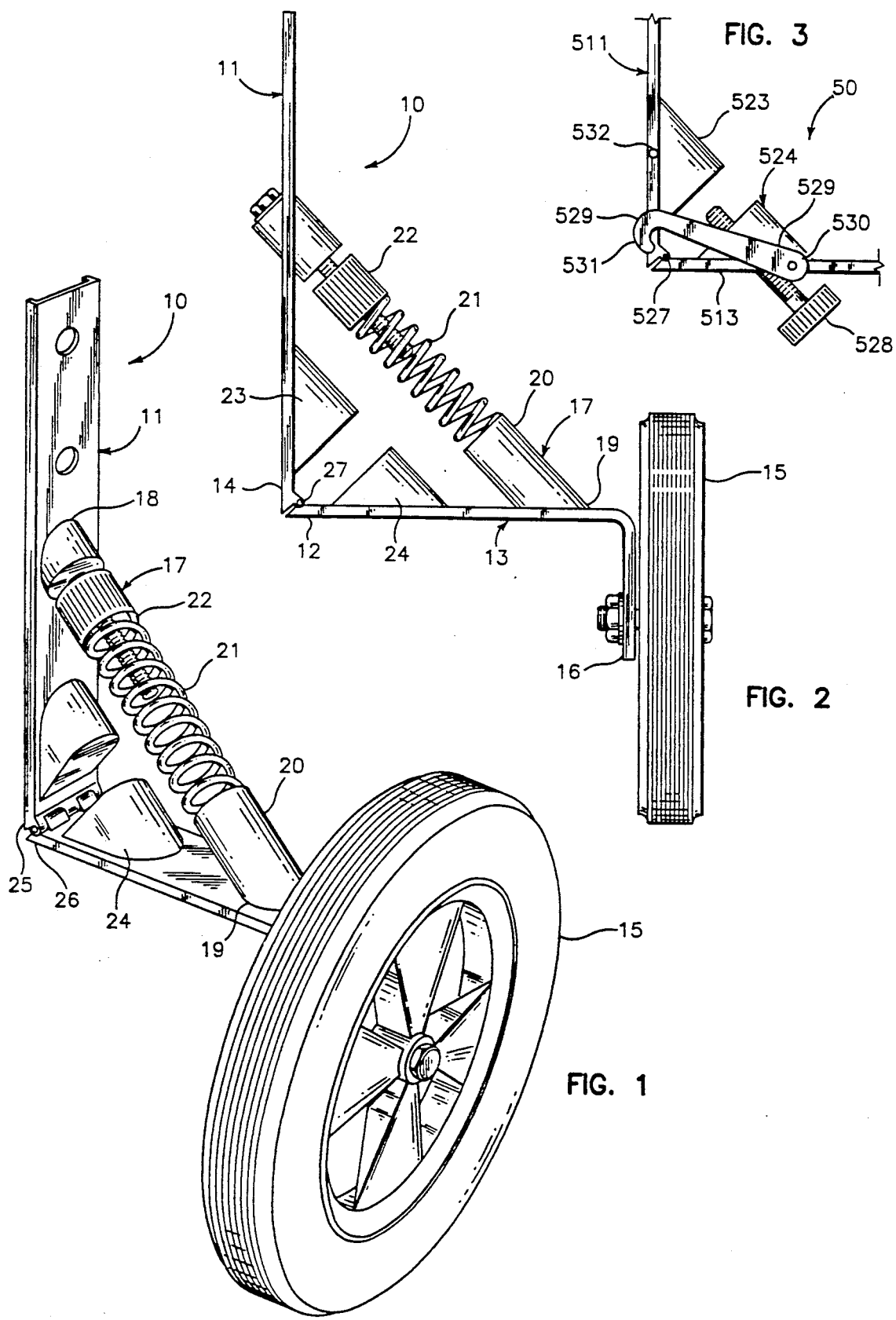

ADJUSTABLE TRAINING WHEEL APPARATUS

BACKGROUND OF THE INVENTION

1. Field of the Invention

The invention relates to an adjustable training wheel apparatus to assist children to maintain their balance while learning to ride a bicycle. The apparatus is adjustable and teaches balance and coordination. The apparatus preferably attaches to both sides of the rear wheel of the bicycle.

2. Description of the Related Art

Training wheels of various design have been placed on bicycles in the past. Many of these devices were fairly simple. Some of the devices performed other functions other than assisting in the balance of the bicycle.

U.S. Pat. No. 2,220,528 to C. R. Kutil on Nov. 5, 1940 shows a convertible bicycle attachment. The attachment has two side wheels that raise the rear bicycle wheel off the ground until someone sits on the bicycle. The side wheel attachment also acts as a shock absorber.

U.S. Pat. No. 3,877,727 to K. L. Johannsen on Apr. 15, 1975 describes retractable bicycle training wheels. The device has a hinged outrigger arm with a tension spring to raise the arm up when the outrigger strut is loosened.

SUMMARY OF THE INVENTION

A bicycle is a very popular means of transportation for people around the world. Children especially use the bicycle for their main mode of transportation. The earlier a child learns to ride the quicker he or she begins to experience independence. Children normally begin riding a tricycle before learning to a bicycle. The transition between tricycle and bicycle is often bridged by placing training wheels on the bicycle to assist in balancing the bicycle. Before the present invention, training wheels did not provide a child with the "feel" of the bicycle. Should a child become lazy, he or she could ride a bicycle with training wheels of a previous design by leaning to one side or the other supporting himself or herself on the training wheel and never learn to balance a bicycle properly.

The present invention provides an adjustable preloaded spring assembly that will support the rider yet allow the bicycle to sway a certain amount. This allows the child to learn to adjust and balance the bicycle naturally within a preselected amount of movement. This allows the transition from tricycle to bicycle to occur much more naturally and rapidly.

A training wheel apparatus in combination with a bicycle is described herein that has a first support member removably attached to the bicycle and a hinge end of a second support member hingedly attached to an attachment end of the first support member that allows radial movement of the second support member in relation to the first support member. There is a wheel rotatively connected to the second support member, at a wheel end of the second support member, distal from the hinge end. An adjustable preloaded strut is attached, at a first end of the strut, to the first support member. The adjustable preloaded strut is also attached, at a second end of the strut, to the second support member. This causes a predetermined force to be applied to the second support member from the first support member that resists the radial movement of the second support member toward the first support member.

The first support member may have a first rotation restriction lobe attached near the attachment end of the first support member. The first lobe restricts the amount of radial movement of the second support member towards the first support member. The second support member may have a second rotation restriction lobe attached near the hinge end of the second support member. The second lobe also restricts the amount of radial movement of the second support member towards the first support member.

In the preferred embodiment, the first lobe and the second lobe allow the second support member to rotate toward the first support member upwardly from the horizontal in a range of approximately 10 to 20 degrees. This provides increased stability by not allowing the second support member to move so much that the rider could become greatly over balanced by the shift.

The adjustable preloaded strut has a spring barrel attached to the second support member at the second end of the strut. There is a spring, in compression, partially within the spring barrel to reduce buckling of the spring. There is a spring compression adjustment member that adjusts the amount of the force the spring exerts on the second support member from the first support member to resist the radial movement of the second support member toward the first support member.

The training wheel apparatus may also have a first hinge rotation stop tab on the attachment end of the first support member. There may be a second hinge rotation stop tab on the hinge end of the second support member. The second stop tab abut the first stop tab to restrict the radial movement of the second support member away from the first support member. The stop tabs are to reduce the chance that the spring loaded strut will force the rear wheel of the bicycle off the ground resulting in the rear wheel having no or little traction.

The second rotation restriction lobe may have an adjustable stop member therein that adjustably restricts the amount of radial movement of the second support member toward the first support member to resist the radial movement of the second support member toward the first support member.

The training wheel apparatus may also have a second member lock-out element that has one end attached to the second support member and another end selectively and releasing connected to the first support member to restrict the radial movement of the second support member away from the first support member.

It is an object of this invention to provide an adjustable training wheel apparatus that will allow an unexperienced rider to adjust to the "feel" of riding a bicycle and learn to balance more naturally with a set of training wheels that allows the bicycle to sway within certain adjustable limits.

BRIEF DESCRIPTION OF THE DRAWINGS

FIG. 1 is a perspective of the preferred embodiment of the training wheel/apparatus.

FIG. 2 is a front view of the preferred embodiment.

FIG. 3 is a partial front view of an alternative embodiment showing the position of the adjustable stop member on the second rotation restriction safety lobe.

DESCRIPTION OF THE PREFERRED EMBODIMENT

FIGS. 1, 2 and 3 describe a training wheel apparatus 10 in combination with a bicycle (not shown). A first support member 11 may be removably attached to the bicycle. A hinge end 12 of a second support member 13 is hingedly attached to an attachment end 14 of the first support member 11 allowing radial movement of the second support member 13 in relation to the first support member 11. There is a wheel 15 rotatively connected to the second support member 13, at a wheel end 16 of the second support member 13, distal from the hinge end 12.

An adjustable preloaded strut 17 is attached, at a first end 18 of the strut 17, to the first support member 11 and attached, at a second end 19 of the strut 17, to the second support member 13, causing a predetermined force to be applied to the second support member 13 from the first support member 11 to resist the radial movement of the second support member 13.

In the preferred embodiment, the adjustable preloaded strut 17 has a spring barrel 20 attached to the second support member 13 at the second end 19 of the strut 17. There is a spring 21 in compression partially within the spring barrel 20 to reduce buckling of the spring 21. A spring compression adjustment member 22 adjusts the amount of the force the spring 21 exerts on the second support member 13 from the first support member 11 t resist the radial movement of the second support member 13 toward the first support member 11.

A first rotation restriction lobe 23 attached near the attachment end 14 of the first support member 11 restricts the amount of radial movement of the second support member 13 towards the first support member 11. A second rotation restriction lobe 24 attached near the hinge end 12 of the second support member 13 also restricts the amount of radial movement of the second support member 13 towards the first support member 11.

There is a first hinge rotation stop tab 25 on the attachment end 14 of the first support member 11. There is a second hinge rotation stop tab 26 on the hinge end 12 of the second support member 13. The second stop tab 26 abuts the first stop tab 25 to restrict the radial movement of the second support member 13 away from the first support member 11. The preferred maximum angle formed at the hinge 27 is approximately 90 degrees.

In an alternative embodiment 50 (a partial view is shown in FIG. 3), the second rotation restriction lobe 524 may have an adjustable stop member 528 therein that adjustably restricts the amount of radial movement of the second support member 513 toward the first support member 511 to resist the radial movement of the second support member 513 toward the first support member 511.

The alternative embodiment 50 of the training wheel apparatus 10 may also have a second member lock-out element 529 that has one end 530 rotatively attached to the second support member 513 and have another end 531 selectively and releasing connected to the first support member 511 to a lock member 532 to restrict the radial movement of the second support member 513 away from the first support member 511. The spring 521 (not shown in FIG. 3) would be adjusted to allow the second support member 513 to be more easily rotated toward the first support member 511 and then the lock-out member 513 would be hooked onto lock member 532. Alternative lock-out mechanisms could be used.

The foregoing descriptions and drawings of the invention are explanatory and illustrative only, and various changes in shape, sizes and arrangements of parts as well certain details of the illustrated construction may be made within the scope of the appended claims without departing from the true spirit of the invention.

I claim:

1. A training wheel apparatus in combination with a bicycle comprising:
   a. a first support member removably attached to the bicycle; wherein the first support member further comprises a first rotation restriction lobe attached near the attachment end of the first support member to restrict the amount of radial movement of the second support member towards the first support member;
   b. a hinge end of a second support member hingedly attached to an attachment end of the first support member allowing radial movement of the second support member in relation to the first support member;
      wherein the second support member further comprises a second rotation restriction lobe attached near the hinge end of the second support member to restrict the amount of radial movement of the second support member towards the first support member;
   c. a wheel rotatively connected to the second support member, at a wheel end of the second support member, distal from the hinge end; and
   d. an adjustable preloaded strut attached, at a first end of the strut, to the first support member and attached, at a second end of the strut, to the second support member causing a predetermined force to be applied to the second support member from the first support member to resist the radial movement of the second support member.

2. A training wheel apparatus as described in claim 1 wherein the adjustable preloaded strut comprises:
   a. a spring barrel attached to the second support member at the second end of the strut;
   b. a spring in compression partially within the spring barrel to reduce buckling of the spring; and
   c. a hand operated spring compression adjustment member comprising a threaded bolt having a knurled turning head on the bolt and said heat partially housing one end of the spring, that adjusts the amount of the force the spring exerts on the second support member from the first support member to resist the radial movement of the second support member toward the first support member.

3. A training wheel apparatus as described in claim 1 further comprising:
   a. a first hinge rotation stop tab on the attachment end of the first support member; and
   b. a second hinge rotation stop tab on the hinge end of the second support member, the second stop tab abutting the first stop tab to restrict the radial movement of the second support member away from the first support member.

4. A training wheel apparatus in combination with a bicycle comprising:
   a. a first support member removably attached to the bicycle;

b. a hinge end of a second support member hingedly attached to an attachment end of the first support member allowing radial movement of the second support member in relation to the first support member;

c. a wheel rotatively connected to the second support member, at a wheel end of the second support member, distal from the hinge end;

d. an adjustable preloaded strut attached, at a first end of the strut, to the first support member and attached, at a second end of the strut, to the second support member causing a predetermined force to be applied to the second support member from the first support member to resist the radial movement of the second support member;

wherein the adjustable preloaded strut comprises:

a hand-operated spring barrel attached to the second support member comprising a threaded bolt having a knurled turning head on the bolt and said head partially housing one end of the spring, at the second end of the strut;

a spring in compression partially within the spring barrel to reduce buckling of the spring; and a spring compression adjustment member that adjusts the amount of the force the spring exerts on the second support member from the first support member to resist the radial movement of the second support member toward the first support member;

e. a first rotation restriction lobe attached near the attachment end of the first support member to restrict the amount of radial movement of the second support member towards the first support member;

f. a second rotation restriction lobe attached near the hinge end of the second support member to restrict the amount of radial movement of the second support member towards the first support member;

g. a first hinge rotation stop tab on the attachment end of the first support member; and h. a second hinge rotation stop tab on the hinge end of the second support member, the second stop tab abutting the first stop tab to restrict the radial movement of the second support member away from the first support member.

5. A training wheel apparatus as described in claim 4 wherein the second rotation restriction lobe further comprises an adjustable stop member therein that adjustably restricts the amount of radial movement of the second support member toward the first support member to resist the radial movement of the second support member toward the first support member.

6. A training wheel apparatus as described in claim 4 further comprising a second member lock-out element having one end attached to the second support member and another end selectively and releasing connected to the first support member to restrict the radial movement of the second support member away from the first support member.

* * * * *